(12) United States Patent
Hilger

(10) Patent No.: US 8,881,251 B1
(45) Date of Patent: Nov. 4, 2014

(54) ELECTRONIC AUTHENTICATION USING PICTURES AND IMAGES

(71) Applicant: RememberIN, Inc., Hopkinton, MA (US)

(72) Inventor: Stuart Hilger, Hopkinton, MA (US)

(73) Assignee: RememberIN, Inc., Hopkinton, MA (US)

( * ) Notice: Subject to any disclaimer, the term of this patent is extended or adjusted under 35 U.S.C. 154(b) by 0 days.

(21) Appl. No.: 13/774,949

(22) Filed: Feb. 22, 2013

Related U.S. Application Data

(60) Provisional application No. 61/653,075, filed on May 30, 2012.

(51) Int. Cl.

| | |
|---|---|
| G06F 7/04 | (2006.01) |
| G06F 15/16 | (2006.01) |
| G06F 17/30 | (2006.01) |
| H04L 29/06 | (2006.01) |
| G06F 21/00 | (2013.01) |
| G06F 21/32 | (2013.01) |
| G06F 21/36 | (2013.01) |
| G06F 21/31 | (2013.01) |
| H04L 9/32 | (2006.01) |

(52) U.S. Cl.
CPC .............. H04L 63/083 (2013.01); G06F 21/32 (2013.01); G06F 21/36 (2013.01); G06F 21/31 (2013.01); H04L 9/3226 (2013.01)
USPC .................. 726/7; 726/19; 713/183; 713/184

(58) Field of Classification Search
CPC ......... G06F 21/36; G06F 21/31; G06F 21/32; H04L 63/08; H04L 63/083; H04L 9/3226
USPC ............................................................. 726/7
See application file for complete search history.

(56) References Cited

U.S. PATENT DOCUMENTS

| | | | | |
|---|---|---|---|---|
| 5,559,961 | A | * | 9/1996 | Blonder ........................ 726/18 |
| 6,278,453 | B1 | * | 8/2001 | Bodnar ........................ 715/764 |

(Continued)

OTHER PUBLICATIONS

Wiedenbeck, Susan et al., Authentication Using Graphical Passwords: Effects of Tolerance and Image Choice, Symposium on Usable Privacy and Security (SOUPS) 2005, Jul. 6-8, 2005, Pittsburgh, PA.*

(Continued)

*Primary Examiner* — Carolyn B Kosowski
(74) *Attorney, Agent, or Firm* — Hamilton, Brook, Smith & Reynolds, P.C.

(57) ABSTRACT

A method and system for user authentication uses photos, pictures, images, pictures of words, logos, graphics, icons, or pictures of colors (graphical elements) as password elements (graphical password) to gain access to a secure platform, section of a platform, specific content, website, computer, mobile device or other electronic device (secure content). The Method and system provide the creation, use in authentication and maintenance of the graphical password. Graphical password creation is initiated through user selection and platform storage of a subset of one or more platform provided or user provided graphical elements (secret graphical elements). The graphical elements are photos, pictures or images that are memorable to the user and are from within one or more relevant categories, e.g. colors, playing cards, animals. A graphical user interface (GUI) having virtual dials, wheels, reels or keypads to display images is used to implement the login/authentication process.

26 Claims, 6 Drawing Sheets

(56) References Cited

U.S. PATENT DOCUMENTS

| | | | |
|---|---|---|---|
| 6,686,931 B1* | 2/2004 | Bodnar | 715/741 |
| 6,718,471 B1* | 4/2004 | Kashima | 726/9 |
| 6,861,946 B2* | 3/2005 | Verplaetse et al. | 340/407.2 |
| 6,934,860 B1* | 8/2005 | Goldstein | 713/183 |
| 6,980,081 B2* | 12/2005 | Anderson | 340/5.53 |
| 7,174,462 B2* | 2/2007 | Pering et al. | 713/182 |
| 7,240,367 B2* | 7/2007 | Park | 726/18 |
| 7,243,239 B2* | 7/2007 | Kirovski et al. | 713/184 |
| 7,266,693 B1* | 9/2007 | Potter et al. | 713/169 |
| 7,724,923 B2* | 5/2010 | Hamid | 382/115 |
| 7,992,202 B2* | 8/2011 | Won et al. | 726/19 |
| 8,176,550 B2* | 5/2012 | Kishi | 726/21 |
| 8,332,958 B2* | 12/2012 | Nishimi et al. | 726/28 |
| 8,347,103 B2 | 1/2013 | Jones et al. | |
| 8,621,396 B1* | 12/2013 | Gossweiler, III | 715/863 |
| 8,732,819 B2* | 5/2014 | Maetz et al. | 726/18 |
| 8,769,607 B1* | 7/2014 | Jerdonek et al. | 726/1 |
| 8,812,861 B2* | 8/2014 | Osborn et al. | 713/182 |
| 2002/0029341 A1* | 3/2002 | Juels et al. | 713/184 |
| 2004/0010722 A1* | 1/2004 | Ha | 713/202 |
| 2004/0230843 A1* | 11/2004 | Jansen | 713/202 |
| 2004/0260955 A1* | 12/2004 | Mantyla | 713/202 |
| 2006/0206717 A1* | 9/2006 | Holt et al. | 713/182 |
| 2006/0206918 A1* | 9/2006 | McLean | 726/2 |
| 2007/0266428 A1* | 11/2007 | Downes et al. | 726/5 |
| 2007/0277224 A1* | 11/2007 | Osborn et al. | 726/2 |
| 2008/0098464 A1* | 4/2008 | Mizrah | 726/5 |
| 2008/0209526 A1* | 8/2008 | Varghese et al. | 726/5 |
| 2009/0106825 A1* | 4/2009 | Cerruti et al. | 726/5 |
| 2009/0199295 A1* | 8/2009 | Shih et al. | 726/18 |
| 2010/0046748 A1* | 2/2010 | Kusnoto et al. | 380/42 |
| 2010/0169958 A1* | 7/2010 | Werner et al. | 726/6 |
| 2011/0283353 A1* | 11/2011 | Maetz et al. | 726/18 |
| 2012/0102551 A1* | 4/2012 | Bidare | 726/4 |
| 2013/0036461 A1 | 2/2013 | Lowry | |
| 2014/0181956 A1* | 6/2014 | Ahn et al. | 726/18 |

OTHER PUBLICATIONS

Pierce, Justin D. et al., Graphical Authentication: Justifications and Objectives, 2004.*

Ku, Wei-Chi and Maw-Jinn Tsaur, A Remote User Authentication Scheme Using Strong Graphical Passwords, Proceedings of the IEEE Conference on Local Computer Networks 30th Anniversary (LCN '05), 2005.*

Etherington, D. "Apple Patents Image Identification Unlocking Method for iPhones and Macs" [online], retrieved on Feb. 8, 2013]. Retrieved from the Internet URL: http://techcrunch.com/2013/02/07/apple-patents-image-identification-unlocking-method-for-iphones-and-macs/.

\* cited by examiner

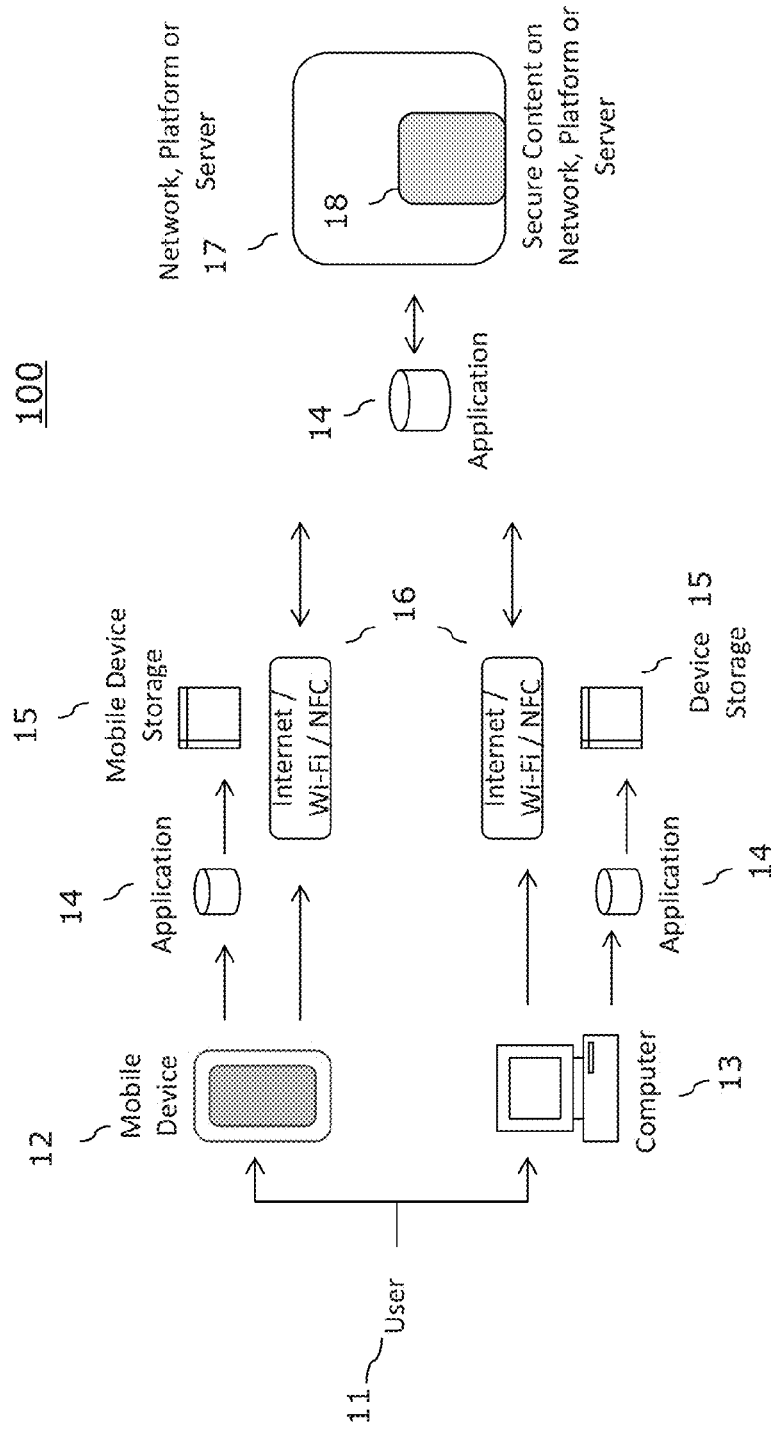

ELECTRONIC AUTHENTICATION USING PICTURES AND IMAGES

RELATED APPLICATION

This application claims the benefit of U.S. Provisional Application No. 61/653,075, filed on May 30, 2012.

The entire teachings of the above application(s) are incorporated herein by reference.

FIELD OF INVENTION

The present invention is directed to electronic authentication such as for enabling access to a secured electronic area/platform, operation, device or content. In particular, the present invention is directed to electronic authentication using pictures and images.

BACKGROUND OF THE INVENTION

Traditional user authentication methods have existed for several decades. There are three main techniques (or a combination thereof) for user authentication: 1) knowledge based methods which are based on what a user knows or remembers 2) token-based methods which allow user access according to what a user has in their physical possession; and 3) biometric methods which are based on unique physical features of the user.

Biometric Authentication

Biometric Authentication is the automated recognition of people via distinctive anatomical and behavioral traits. Biometric authentication uses human biological signatures including fingerprint, voice print, facial heat print, iris scan etc. to authenticate a user. Although biometrics can be effective for user identification, biometric methods are difficult to implement and require specialized devices or software to capture and convert biometric information. Capture of the biometric traits may be expensive or inappropriate for specific types of devices or applications. The human aging process contributes to changing biometric signatures that can influence the authentication success rate. Also, because of its relative newness to the authentication market, it has not been tested for long periods to determine if methods are effective as user biologic conditions change over time, e.g. finger prints, etc.

Token or RFID

Token, RFID or near field authentication is based on what authorized users have in their possession to transmit PIN or password information. This is often accomplished through a dedicated ID card with readable magnetic strip, radio frequency identification (RFID) chip or other near field communication device (NFC).

These methods of authentication can be an issue if the devices emitting the codes are misplaced or stolen. However, most token-based authentication systems also use knowledge-based authentication to prevent impersonation through theft or loss of the token. An example is automated teller machine (ATM) authentication, which requires a combination of a token (e.g., a bank card) and secret knowledge based, recall method of authentication, e.g., PIN code.

Knowledge Based Authentication

Traditional knowledge based authentication uses something that the authorized user knows either through recalling (recall), cued recalling or recognizing (recognition) authentication information. Recall based authentication is rendered most often in the form of an alpha-numeric password or Personal Identification Number (PIN) that a user recalls during an authentication session. Given the password, or PIN, is based on a large number of upper and lower case alpha-numeric characters, the passwords can be secure and used to authenticate the authorized user with little fear of the password being hacked through brute force algorithms or other methods.

There are limitations and weakness with traditional alpha-numeric PINs and passwords. First, weak, less complex passwords can be subject to dictionary or brute force attacks. Complex alpha-numeric passwords are difficult to remember especially if not used on a frequent basis. Incorrect password input results in lock outs or pauses in access causing user frustration and potential negative impacts to work output in a networked environment. Second, these passwords at times are not "random" and often are built leveraging decipherable terms like D.O.B.s (dates of birth), children's names, maiden names, pet names, etc. This makes passwords less than random and have higher probabilities for hacker guessing access. Another practical weakness is that users often record or write passwords down thus diminish the strength of the complex, alpha-numeric password to the level of how well the user has hidden the password in written form.

Passwords can be stolen through shoulder surfing or attacks such as man-in-the-middle where passwords are intercepted in a communication element and reused to assume identities. Devices such as camera phones or other recording device, e.g. security cameras, can record passwords that are input during authentication through keyboards or other input devices. Most secure sources prompt users to change passwords periodically. This can increase the probability of lock outs through users remembering old passwords instead, or increase risk of users writing down or recording passwords instead of memorizing the current password.

Recognition Based Passwords

There are dozens of recognition based graphical authentication methods. Recognition based graphical passwords can provide benefits over these current authentication methods depending on the device, situation and level of password strength required.

There is a fundamental difference between recall-based authentication systems, such as text passwords, and recognition-based ones, such as photographic authentication. Recall based methods use a unique piece of knowledge, i.e., the password, to perform the authentication process, while recognition based methods use a challenge-response sequence and prompt for the correct authentication response, i.e., selecting one memorable image from a set of random images. Research has proven it is easier to recognize content than to recall the same content without an aided prompt.

Graphical Image Based Authentication

Recognition based passwords such as graphical image passwords offer a more memorable and secure alternative to traditional alpha-numeric PINS and passwords. Graphical passwords use pictures or images instead of letters or numbers. Research has shown that pictures and images are more memorable to humans than letters and numbers.

The selection method itself can also cause issues with authentication in recall based approaches. The need for repeated taps (e.g. on a touch screen), drawn lines and shapes, connecting of images/dots or user drawn images can cause smudge marks which provide an indication of the graphical password or digits used in a PIN. Even with these more graphical approaches, users tend to limit the alpha-numeric character set used, or the drawing process can be less efficient and open to potential error. For example, some of the tap points are distinctive features in the image and tend to be selected as components ahead of non-distinctive features.

There is a growing problem with password theft when hackers send an email notification suggesting an issue or update to a secure account is required and offer a fake or duplicate log in screen. This practice is called "phishing". When users input password and PIN information into the fake screen during the phishing session, the program can capture the authorized users account number and password indicated through recording input information or mouse clicks.

Another concern is discernible differences in photos that can be assessed for likelihood of selection as the secret graphical image. In one embodiment, no manual filtering or editing of the user-provided image sets need be performed. User's images can be copied from their pre-existing private collection. Many photographs in a personal database are similar and therefore hard to distinguish, or are duplicates or unrecognizable thus require some sort of management method to normalize or edit the graphical images.

Graphical methods are in use where a user draws a "secret shape" referred to in the art as drawing a secret (DAS) on a touch sensitive screen. The method captures the movement of the users input method, e.g. finger or stylus, and compares it to the movement recorded in the registration process. The user can select any combination of pixels available on the screen as the password. However, in practice users tend to draw images consisting of a small number of continuous lines or known objects, e.g. square, circle, triangle. Guessing from all possible starting points, and examining all lines emanating from those start points is manageable with low password strength.

Some other graphical methods require users to memorize the image during the setup or registration phase so as to be able to recognize them later during an authentication session. These methods require a training or education phase to generate the graphical password and then provide an immediate test component to ensure that the user has memorized his password. This process can be more effective if the user is allowed to select memorable, relevant images making recall easier during authentication.

SUMMARY OF THE INVENTION

Applicant provides a computer method and system for user authentication that uses photos, pictures, images, pictures of words, logos, graphics, icons, or colors (graphical elements) as password elements (graphical password) to gain access to all, a sub-section or specific content within a secure platform, website, computer, mobile device or other electronic device (secure content).

The method/system provides for the creation, use and support of the graphical password. Graphical password creation is initiated through user selection and platform storage of a subset of one or more platform provided or user provided graphical elements (secret graphical elements) of memorable photos, pictures, images, colors or words from within one or more relevant categories of graphical elements, e.g. colors, playing cards, animals. Graphical password creation can be confirmed within the application or via email or other secure communication link once the graphical password is developed as part of user registration (graphical password creation).

To gain access to the secured content after user registration (authentication session), the user launches the application and selects the secret graphical elements from a menu of similar graphical elements from the same graphical categories generated by the platform. That is, the platform may generate, obtain or otherwise produce for presentation, in no particular order (random order), similar graphical elements per same graphical category. Next the platform randomly places the similar graphical elements together with the secret graphical elements in a user interface comprised either of scrolls, dials, reels, pull down boxes, pads or panels (selection method) from which a user is to identify (find) and select secret elements. The user selects these elements through clicking on or highlighting the elements, moving the secret elements via scroll bar, dial, drag and drop to a predetermined or highlighted area, or the like (or some other means of selection) to confirm his selection for authentication. Once selected, graphical elements can be modified, masked or morphed (such as grayed out or blurred) by the system to lessen risk of shoulder surfing, etc.

During the authentication session, the system compares the user chosen elements from the menu of graphical elements to the secret graphical elements defined and stored from user registration. If the authentication session graphical elements match the secret graphical elements from the registration process, the user is granted access to the secure content. If not and after a pre-determined number of unsuccessful attempts at selecting the secret graphical elements, the application disables access to the secure content. In this event, the application provides a method to gain access to the secret graphical elements stored on the platform or to reset the graphical password through a secret challenge process using user supplied questions and answers or through the provision of a personal, confidential graphical image saved during the registration process.

The user can increase or decrease the strength of the graphical password by (1) increasing or decreasing the total number of secret graphical elements established in the registration process that must match during the authentication session or (2) increasing or decreasing the total number of platform supplied similar graphical elements in the menu during authentication or (3) excluding subsequent secret graphical elements from the selection method if the initial or other secret graphical element is not selected or (4) requiring the user to place the secret graphical elements in proper sequence as defined in the graphical password creation process from the different displayed categories and the random menu of graphical elements in the authentication session.

Thus the present invention relates to authentication methods and systems that leverage human's abilities to recognize and use graphical images to provide access to all, a sub-section (portion) or specific content within a secure platform, network, website, computer, mobile device or other electronic device. Embodiments of the present invention meet the following proposed requirements for a proper graphical image password and avoid or reduce the weaknesses of the current alpha-numeric and graphical password methods in the art.

Proposed Requirements for Graphical Passwords

1. To limit risk of dictionary attacks (exhaustive searches through all words found in dictionaries and other sources), any alpha-numeric values assigned to the secret graphical image password should be a random combination of upper and lower case letters and numbers of sufficient length to avoid guessing and brute force attacks. The present invention does not limit the length, frequency of changes or process of generating the alpha-numeric values assigned to the graphical password.

2. The authentication process should be resistant to shoulder surfing or recording attacks to limit access from authorized users.

3. The password should be simple and not written down. Preferably, the password format should make it easy for the user to memorize the password mentally, avoiding the need to write it down on a piece of paper.

4. The password should be simple to maintain with a clear, simple hint or reset process if needed.

5. The password should be memorable and not require training or recall testing during the password creation and registration process.

6. The authentication method should be resistant to phishing where hackers send an email notification suggesting an issue or update is required to a secure account and offer a fraudulent log in screen. The fraudulent screen used during the phishing session can capture the authorized users account number and password indicated through recording input information or mouse clicks.

7. The method should not require the user to draw a picture or line so as to minimize tracking smudges on the device.

8. The graphical images used should be consistent, but distinguishable to limit the increased likelihood that some images would be selected over others.

9. Secret graphical images should be placed or presented randomly in the interface or selection method to avoid hackers guessing the correct image based on location on the device or in the user interface screen view.

10. Users should be able to control the strength of their password.

11. Users should be able to personalize their graphical images.

12. During the graphical password creation process, users should be able to see the strength and relative strength of their password compared to normal environmental occurrences, e.g. lighting strikes, etc.

13. Users should be able to disable the graphical password on the selection method or from a remote device.

14. Users should be able to select their graphical images quickly with the selection method provided.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A and 1B are schematic illustrations of a graphical password or graphical authentication system embodying the principles of the present invention.

DETAILED DESCRIPTION OF THE INVENTION

Figure 1B:
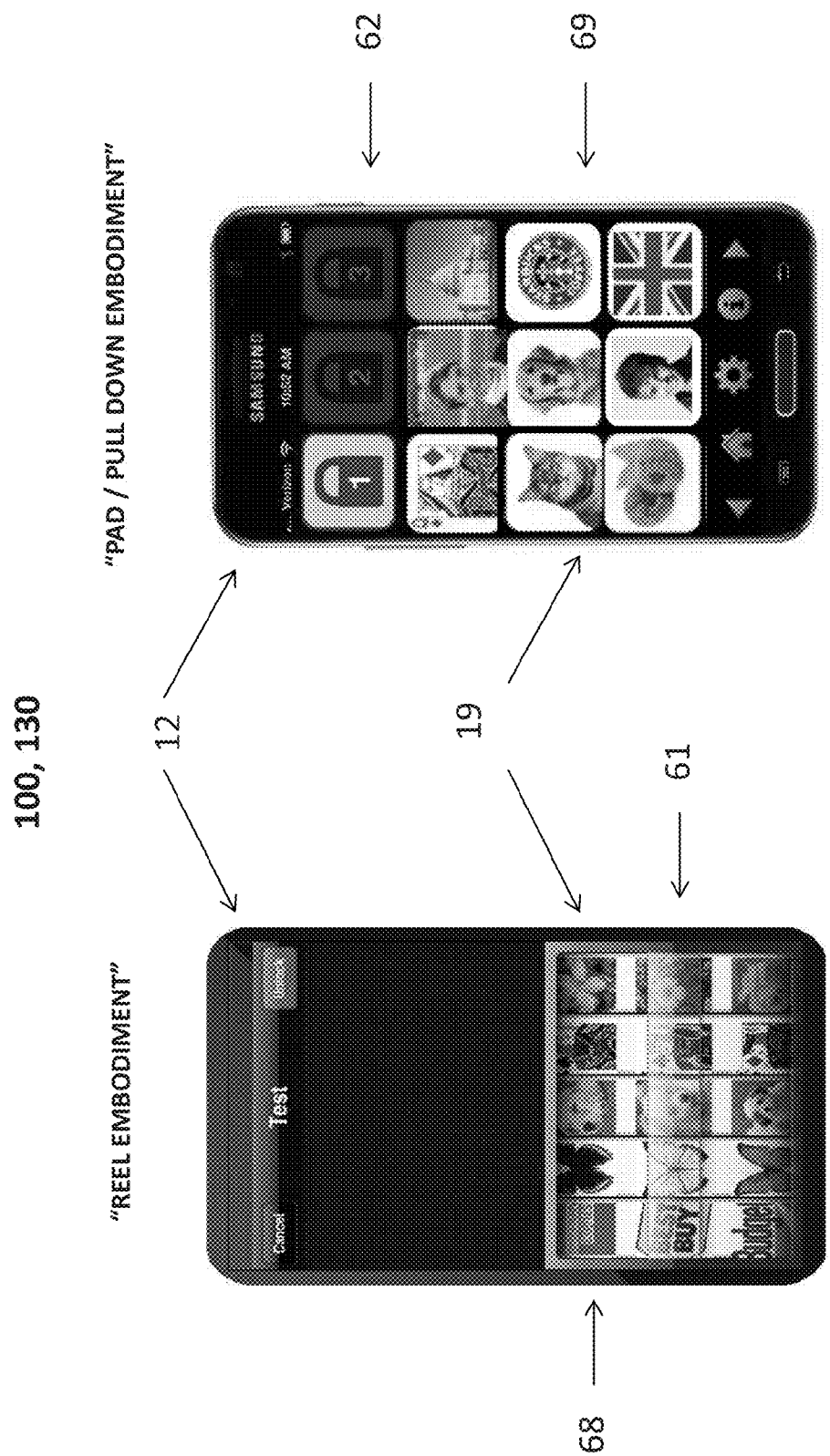

Applicants have discovered that mobile devices provide a unique interface and method for allowing users to make selections from rich graphical images and pictures. As used herein, "mobile devices" include a mobile phone, portable music player device, electronic reader, tablet or other portable electronic device capable of rendering a software application. These same devices have storage and processing capabilities to allow for sophisticated authentication procedures and methods to secure confidential content on the device or to provide an access point to secure content on a network. The combination of rich graphical images and emerging processing power of the devices provides for a unique combination to use graphical images as an authentication method to access secure content and other secured areas, items or functionality.

As used herein "secure content", "secured area or platform" and "secured operation or use" are used interchangeably and non-exclusively of one another. Non-limiting examples of a secured area or platform include a website, a software application, a secure network with a graphical interface and input method, e.g., automated teller machines (ATMs), or similar requiring special logon. Non-limiting examples of secured operation or use include a locked mobile device (phone, laptop, etc.) and the like. Non-limiting examples of secure content include password (or other code) protected documents, web pages, address books, and similar bodies of information or data. Other applicable places or situations where secure measures are employed are in the purview of one skilled in the art.

At times only the term "secure content" is used in passages herein for brevity and clarity of description. It is intended that the same or similar statements apply to secured areas or platforms, secured operation or use, etc.

Embodiments provide a method and system for user authentication that uses photos, pictures, images, pictures of words, logos, graphics, icons, or colors (collectively generally referred to as graphical elements) as password elements (graphical password) to gain access to a secure platform, section of a platform, specific content, website, computer, mobile device or other electronic device (secure content). Embodiments provide for the creation, use and support of the graphical password. Graphical password creation is initiated through user selection and platform/device storage of a subset of one or more platform or user provided graphical elements (secret graphical elements) of memorable (to the user) pictures, images, colors or words from within one or more relevant categories of graphical elements, e.g., colors, playing cards, animals. The use of categories to organize the graphical elements provides for a piece-wise or step-wise refined approach to graphical password creation by the user. Graphical password creation can be confirmed via email or other secure communication link once the graphical password is developed as part of user registration (graphical password creation).

Subsequently during an authentication session, the user chooses elements from a menu of graphical elements. The authentication system compares the user chosen elements to the secret graphical elements defined in and stored by the user registration process. If the authentication session graphical elements match the secret graphical elements from the registration process, the user is granted access to the secure content. If the authentication session graphical elements do not match, then after a pre-determined number of unsuccessful attempts by the user at selecting the secret graphical elements, the application (authentication system) disables access to the secure content. In this event, the application provides a method to retrieve the secret graphical elements stored on the platform/device or to reset the graphical password through a secret challenge process using prior user supplied questions and answers or the provision of a personal, confidential graphical image saved during the registration process.

For purposes of illustration and not limitation, example embodiments are shown and described with reference to FIGS. 1-3. Turning to FIGS. 1A and 1B, an overview of embodiments of the present invention is provided. In FIG. 1A, a user 11 accesses embodiments of the invention (i.e., a graphical password system or similar graphical authentication system 100) through a mobile device 12, computer laptop or desktop 13, or other access device. The mobile device 12 can be a mobile phone, music player device, reader, electronic tablet or other portable electronic device capable of rendering a software application.

The graphical authentication system 100 is rendered through an application 14 on the subject device 12/computer 13 and is contained in the device's memory storage 15. Alternatively the application 14 is accessed through the internet or other wireless access means including Wi-Fi and Near Field Communication (NFC) 16. The application 14 together with the graphical authentication system 100 provides for authenticated access to the secure content on the memory storage 15 of the subject device 12/computer 13, or to a secure Network, Platform or Server 17, or to secure content 18 within a portion of a Network, Platform or Server 17.

In embodiments, the authentication process 130 (later detailed in FIG. 3) of graphical authentication system 100 utilizes a user interface 19 (shown in FIG. 1B) and a source of randomized graphical elements (e.g., images, etc.). During an authentication session, the user interface (GUI) 19:

(i) displays to an end-user a revolving area 68, or a pad or block of images 69, having one or more pluralities of ones of the randomized graphical elements from the source with each of the user-defined secret graphical elements dispersed throughout the plurality, (ii) requires the end-user to find in the plurality and to select from the revolving area 68 or pad 69 each of the secret graphical elements that form the graphical password, and (iii) optionally, requires the end-user to indicate (identify) series order (proper sequence of those that appear on the "payline" 61 or highlighted area 62) of the secret graphical elements in the graphical password, in order to authenticate the end-user as the given user of the graphical password.

The revolving area 68 randomly rotates through the plurality of graphical elements and secret graphical elements in a spinning or continuous scrolling fashion. The revolving area 68 may be configured as one or more reels of images, a wheel, a disk, a dial, or may employ one or more pads (keypads), blocks, pull down menus, or columns, and the like to present/display the graphical elements and secret graphical elements to the end-user. End-user selection is then by drag and drop, point and touch, or similar user interaction. Other geometries and configurations of different selection methods are suitable in addition to or instead of those shown in FIG. 1B.

Figure 2:
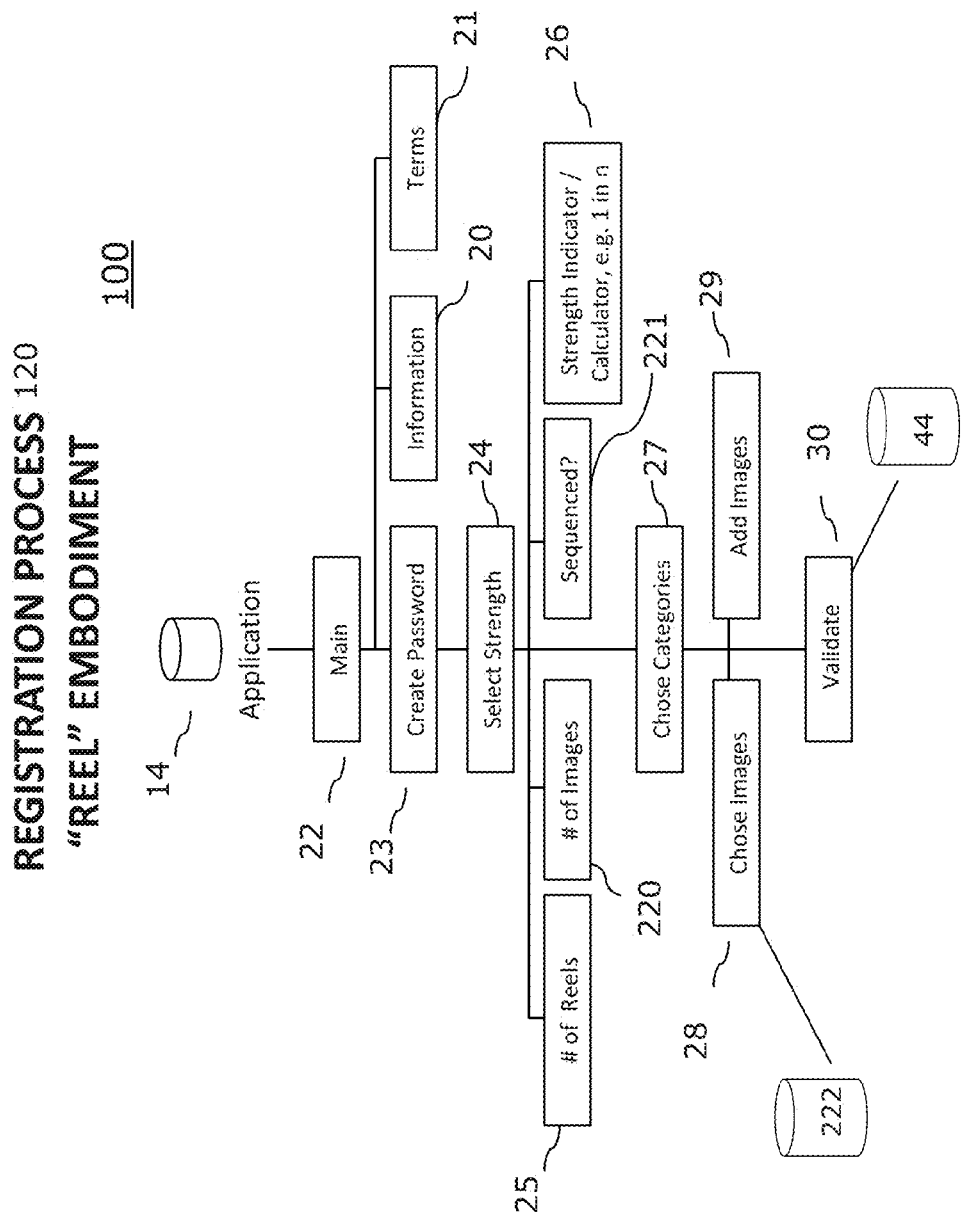
FIG. 2 is a flow diagram of the registration process in the embodiment of FIG. 1.

Creation of a graphical password of the present invention is illustrated in FIG. 2. As previously mentioned, the graphical password may be developed as part of a user registration process 120. The user registration process 120 may be for registering the mobile device 12/computer 13 or other access device, or for registering the user to use a service, software application or other product, membership, etc. In the registration process 120, a user creates a graphical password as follows.

The application 14 presents among other main functions and operations 22, a create password function 23. This function allows the user to create a password 23 using graphical images. Other "main" functions may include for example, review application information function 20 and terms of service 21.

During the password creation process/function 23 in one embodiment, the graphical authentication system 100 provides a unique feature that allows the user to select the strength 24 of his graphical password. The strength of the password is increased by increasing the number of reels (dials, etc.) 25, increasing the total number of images 220 on the reels (i.e., total number being the number of system supplied images, which are randomly placed for the user-viewer, plus one for the user selected secret image of the given reel), or forcing the end-user to place in proper sequence 221 a random set of reels. A strength indicator 26 provides a unique visual depiction and calculation (discussed further below) of the relative strength of the graphical password.

Next, the user chooses secret graphical images from a number of categories of images 27 held in one or more data stores 222 or otherwise made accessible to system 100. For example, one category may be flowers and the images in this category are various images or pictures of different types of flowers in outdoor scenes, in cut-flower arrangements, and so forth. Another category may be dogs and the images in this category may be various images or pictures of the different breeds of dogs, different aged dogs, different number of dogs per image, in different poses and so on. Other subject matter categories are in the purview of one skilled in the art.

The user selects a category 27 and then selects one or more secret images 28 from the available images in the selected category. The graphical authentication system 100/registration process 120 adds the user selected image(s) to the graphical password under construction. Embodiments of the present invention provide a large number of images per category for the user to choose a "secret" image that makes up part of the subject graphical password. The categories help to organize the total number of images and provide an organized and logical way to present large numbers of images to the user for consideration. Otherwise (without categories), the user would be overwhelmed with the vast number of images and unable to effectively view, let alone select, images for the task at hand.

In embodiments, the user selects a secret image 28 from each of the categories 27 of images by repeating steps 27 and 28 until the desired password is formed. That is, steps 27-28 are repeated for each graphical element in the password and thus are iterated the number of times as there are number of graphical elements in the password. In this way, embodiments provide a step-wise or piece-wise construction (or formation) of the password, each iteration of steps 27 and 28 resulting in a respective piece (graphical element) of the password.

The user may also add (at 29) personal images or images from other sources to augment the images in the categories 27 and data store 222. Likewise, the user may create additional categories of images by adding (at 29) personal images or images from other sources. Known techniques for uploading (and/or importing) images to registration process 120 are utilized for this purpose. Examples of other sources of images by the user include but are not limited to: user's personal collections of photographs/images, third party image collections (e.g., school class pictures, athletic team pictures, or other club or group photos), social network accounts, licensed images, and the like.

In embodiments, module 29 normalizes the graphical elements/images from the various sources for inclusion in data store 222. The normalization rules and techniques ensure that the imported images are not identifiable and stand out as belonging to the user or appear to be more susceptible to choice as a secret graphical element of the user. Module 29 normalizes the user imported images based on, for non-limiting example, pixel size, cropping, dpi, shape, colors, and other physical features (especially those that lessen potential guess attacks from unauthorized users).

In other embodiments, module 29 enables the user to update, edit and/or delete the images and/or categories in data store 222. Known techniques are employed by module 29 for these purposes. For example, module 29 enables the user to banish (delete or hide) specific images in data store 222 that may be too similar to the secret images selected by the user to form his graphical password.

Once the user has selected all the secret images and the order of these images that he desires for his graphical password, system 100/registration process 120 stores the image sequence as a graphical password for the user, in a database 44 or server memory. Registration process 120/password creation 23 may store other attributes or network/platform assigned alpha-numeric values of the graphical password in database 44 as further detailed below. Application 14/system 100 can send to the user an email message or some other confirmation communication to validate 30 the newly created graphical password. For example, the email message requests the user to validate and/or activate 30 the graphical password by calling a system phone number, responding to a challenge question or the like. System 100/application 14 is responsive to the user validation 30 by activating the graphical password in the database 44.

Upon activation of the graphical password, the graphical authentication system 100 combines the user's secret images (from the graphical password) with random similar images from the same categories for each reel, pad, pull down box or column. System 100 utilizes the images held in data store 222 as the source of randomized images. Subsequent use of the graphical password in an authentication session is then as outlined in FIG. 3.

Figure 3:
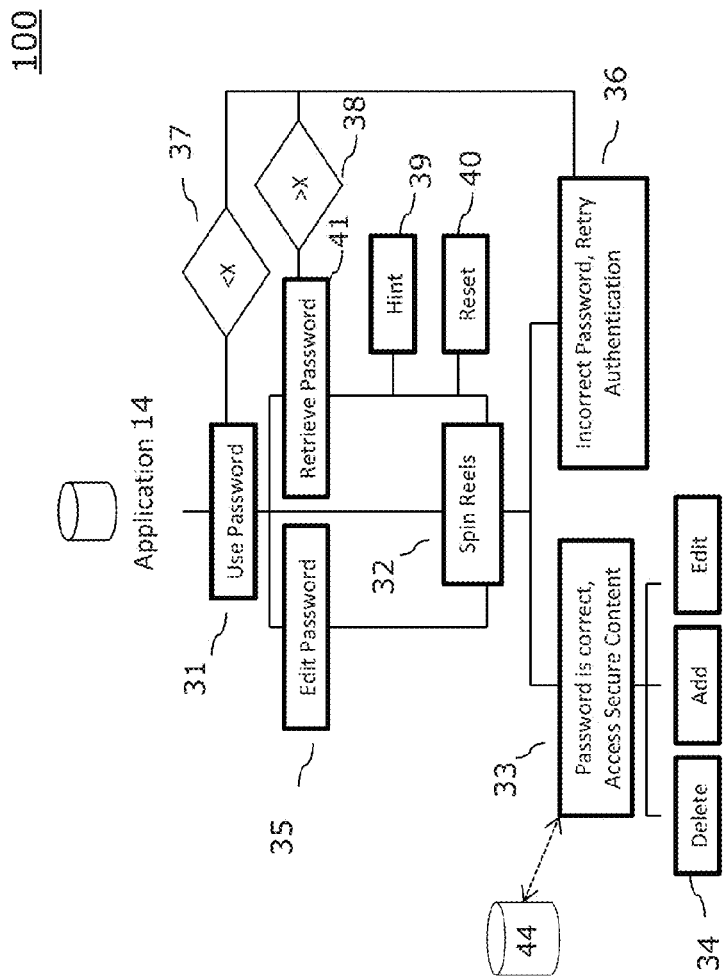
FIG. 3 is a flow diagram of the authentication process in the FIG. 1 embodiment.

The authentication process 130 of system 100 is illustrated in FIG. 3. Continuing with the application 14 example, application 14 employs the graphical password 31 and authentication process 130 to allow or deny user access to the secure content on the mobile storage device 15, or to a secure Network, Platform or Server 17, or to secure content 18 on a portion of a Network, Platform or Server.

The application 14 prompts the user to enter the graphical password at 31. For example, in the "reel" GUI embodiment, the user interface 19 of application 14 presents to the user a number of virtual reels (i.e., the ones set up upon activation of the graphical password in the registration process 120 of FIG. 2). Each reel contains a user selected number of random graphical images from data store 222 and a respective one of the user's selected secret graphical images (of the subject graphical password as stored in password database 44). The user's secret graphical images are dispersed amongst the randomly placed or randomly arranged category images. To authenticate, the user must operate the GUI 19 to rotate or spin 32 (perhaps incrementally) the reels until each of the secret graphical images is positioned in sequence order on the pre-defined, highlighted area or payline 61 (FIG. 1B). If the user correctly identifies and selects (positions in line) all the secret graphical images in this manner, then the authentication process 130 (at 33) determines that the user has correctly entered the graphical password into application 14. The authentication process 130/application 14 in turn provides to the user access to the secure content 33. The authenticated user can then add, edit or delete secure content within the application 14 as shown at 34 in FIG. 3.

In embodiments, the authentication process 130 compares the in-session user selected sequence of images as input on the predefined highlighted area/payline 61 to the sequence of secret graphical images of the subject graphical password as stored in graphical password database 44 from the registration process 120. If the authentication session sequence of images matches the sequence of secret graphical images/password elements from the registration process 120, then authentication process 130 (at 33) positively authenticates the user. This triggers the application 14 to pull the appropriate credentials and load the username and password for access to secure content 33. In the event alpha-numeric usernames or passwords are generated from the secret graphical images, one or more incremental authentication processes utilizing the generated alpha-numeric credentials can take place prior to gaining access to a network or other secure content. Various application 14 authentication protocols are supported.

Further, after successful/positive authentication, the user is able to change categories of the graphical elements forming the password, thus change the graphical password as desired. Steps 24-30 of FIG. 2 enable these changes. This may be for increased security purposes.

In the event the user selects/inputs on payline 61 incorrect images as the secret images of the graphical password, the authentication process 130 (at 36) allows the user a pre-defined number of times 37 to retry entering the password 31 through the GUI 19 (e.g., reels). The foregoing steps at 32 (the user operating the GUI 19 to spin the reels and select and align a series of images as a candidate graphical password on payline 61) are repeated. If the user selects incorrect images submitted as the graphical password for authentication more than a threshold 38 number of times, then authentication process 130 presents to the user the option of retrieving from database 44 the password through a challenge process 41. The challenge process may render to the user a hint 39 using a secret question (user defined in the registration process 120), ask the user to identify or submit a challenge secret graphical image/element 39 (user defined, submitted and stored in the registration process 120), or provide the user with a method to reset 40 the graphical password through the selection of new secret graphical images/elements 35. Challenge process 41 may use various levels of hints or challenge questions or challenge images/graphical elements. The hints 39 may be with respect to the categories used for the secret images or with respect to a specific secret image/graphical element. In one embodiment, the registration process 120 sets up a challenge process for each step 27, 28 in creating the graphical password.

In one embodiment, the challenge process 41 or reset process 40 prompts the in-session (authenticating) user to supply an image for comparison to a challenge image stored by the password creator-user during the password creation 23/registration process 120. That is, per password, password database 44 stores the respective challenge image and unique identifier of the device of the authorized user from the registration process 120/password creation 23. Authentication process 130 identifies the device (by unique ID) being used by the in-session user to supply the image and compares the supplied image to the previously stored challenge image corresponding to the device unique ID in password database 44. Upon the comparison resulting in a match of user device and a match of images, the authentication process 130 allows the in-session user to retrieve 41 and/or reset 40 the subject graphical password.

The predefined number of retry attempts 37 and the threshold number of times 38 are set by the authorized user of the graphical password during the registration process 120/password creation 23. These predefined numbers (parameter values) 37, 38 are stored as attributes of the subject graphical password in password database 44. Likewise, the password creation 23/registration process 120 may store a user-specified time allotment (threshold period of time) for the authentication session, e.g., 10 seconds. This limits the time allowed for an unauthorized user to guess the graphical password during authentication process 130. Another user defined time parameter may be the idle time during an authentication session. If authentication process 130 detects that the in-session user is idle (there is no user interaction) for the authorized user-defined amount of time during an authentication session, then authentication process 130 ends the authentication session. This prevents unauthorized access due to an interrupted authentication session on an abandoned input method from authorized users.

In other embodiments, the authentication process 130 captures time and location of each authentication attempt through application 14. This data (captured date/time and location) may be stored in a log of application 14 or searchable memory area. This may help recover or locate a device 12, 13 being fraudulently used.

As described above in embodiments, a user creates or otherwise sets up a graphical password of the present invention by selecting images that are memorable to him from relevant categories, e.g. Flowers, dogs, etc. In embodiments, the graphical authentication system 100 provides 15-50 images, for example, for the user to choose one or more "secret" images that make up the graphical elements of his password. The user selects between 4-10 secret images, for example, from up to five categories of images (or a maximum number of reels/scrolls or pads). Categories may include topical areas, licensed images, and/or personal photographs/images uploaded by the user or a third party. Password strength can then be increased via more reels/scrolls/pads, more random images (mixed with a secret image) per scroll or pad, or by adding a color component to replace a numerical component to the graphical password.

In a preferred embodiment, the user can increase or decrease the strength of the graphical password by: (1) increasing or decreasing the total number of secret graphical elements (established as number of reels 25 in the example registration process 120) that must match during user authentication, or (2) increasing or decreasing the number of randomized images (i.e., system 100 supplied similar graphical elements in a menu/reel/scroll/pad) used per scroll or pad during authentication (as user-defined at 220 in the registration process 120), or (3) withholding or excluding subsequent secret graphical elements from the selection method as a function of the initial or previous secret graphical element being selected, or (4) requiring the user to place the secret graphical elements in proper sequence (as defined/user-settable at 221 in the graphical password creation/registration process 120) from the different displayed categories and the random reel/scroll/menu/pad of graphical elements in the authentication session, or (5) requiring the user to select the proper secret graphical image categories from a large set of potential categories prior to selecting the secret graphical image from each category. Here the categories, in addition to making the image viewing and selection process more effective and efficient in the password construction process, allow for a greater number of photo combinations which can be used to increase the graphical password strength.

Tables 1 and 2 are illustrative. In Table 1, system 100 uses one secret graphical image (or color) per reel with a correct order of categories provided by the system in authentication process 130. The per reel, total number of images (i.e., the number of random images plus one for the user-defined secret image) used is indicated on the left (per table row), and the number of reels (representing the total number of secret graphical elements forming the graphical password) is indicated in the column headings. The values in the table cells indicate the probability of randomly guessing the password, i.e., relative password strength, given the respective row and column settings. Thus if the user selects the number of reels to be 4 (the $4^{th}$ column of Table 1) at setting or step 25 (FIG. 2) in the registration process 120, and selects the total number of images per reel to be 12 (second row of Table 1) at setting or step 220 (FIG. 2) in registration process 120, then the strength indicator/calculator 26 during the registration process 120 indicates or displays to the user that the odds of someone randomly guessing the user's four-element long graphical password is 1 in 20736 or a fairly strong password.

In Table 2, system 100 uses one secret graphical image (or color) per reel as in Table 1 but requires the authenticating user (user in authentication session) to place the secret graphical images in proper sequence order as defined at 221 in the registration process 120. The per reel, total number of images (i.e., number of random images plus the user-defined secret image) used is indicated on the left (per table row), and the number of reels (representing the total number of graphical elements forming the graphical password) is indicated in the column headings. The values in the table cells indicate the probability of randomly guessing the password including sequence order, and thus quantitatively represent relative password strength for the respective row-column settings.

By placing the requirement of proper sequence order of the graphical password's elements be used in authentication, the Table 1 example four-element graphical password has increased odds to 1 in 497,664 of being randomly guessed.

TABLE 1

Password strength determined on probability of random guessing of password - one secret graphical image per reel with correct order of categories/reels provided by the system

| Images/ | Dials/Reels/Categories | | | | |
|---|---|---|---|---|---|
| Colors | 1 | 2 | 3 | 4 | 5 |
| 9 | 9 | 81 | 729 | 6,561 | 59,049 |
| 12 | 12 | 144 | 1,728 | 20,736 | 248,832 |
| 16 | 16 | 256 | 4,096 | 65,536 | 1,048,576 |
| 20 | 20 | 400 | 8,000 | 160,000 | 3,200,000 |
| 25 | 25 | 625 | 15,625 | 187,500 | 4,687,500 |

TABLE 2

Password strength determined on probability of random guessing of password - one secret graphical image per reel AND required in-session user ordering of random categories/reels

| Images/ | Dials/Reels/Categories | | | | |
|---|---|---|---|---|---|
| Colors | 1 | 2 | 3 | 4 | 5 |
| 9 | 9 | 162 | 4,374 | 157,464 | 7,085,880 |
| 12 | 12 | 288 | 10,368 | 497,664 | 29,859,840 |
| 16 | 16 | 512 | 24,576 | 1,572,864 | 125,829,120 |
| 20 | 20 | 800 | 48,000 | 3,840,000 | 384,000,000 |
| 25 | 25 | 1,250 | 93,750 | 9,375,000 | 1,171,875,000 |

In this way, strength indicator/calculator 26 of FIG. 2 uses these and other similar tables or probability calculations to indicate to the user the relative strength of his to-be-constructed graphical password during the password creation/registration process 120. Strength indicator/calculator 26 may display to the user the pertinent table, a range depiction (e.g., weak, medium, strong) or other visual strength guide. In one embodiment, strength indicator/calculator 26 displays these probabilities along with an indication of probabilities of other random events in a common man's life, e.g., chance of lightening strike, chance of being dealt a straight flush, chance of winning the lottery, etc. This enables the user to make a comparison of the graphical password strength to the probabilities of other random events in the user's environment.

Further, in one embodiment, authentication system 100 manages the images in the categories to improve strength of the graphical password by (1) increasing the number of graphical images available in the registration process 120 and the authentication process 130, and by (2) limiting in registration process 120 re-use of images from data store 222 across different users' passwords. This increases the total universe of available images/graphical elements in authentication system 100 by not over using a single image. Known reporting methods (for instance, a reporter executed by processor 84, FIG. 5) can then generate reports on the universe of secret graphical images/elements used in the data store 222. Aggregate, non-user specific information can be captured and reported to better understand user behavior, brand preferences (where a secret graphical image/element is a logo or similar), geographic and demographic trends and information.

In addition, based on category of images in data store 222 (and referenced by graphical passwords in password database 44), the reporter can identify certain subsets of users as having an interest in a topic. This subset of users becomes a target audience for topic-specific information, communications, advertisements, and the like. For example, those users who used in their graphical passwords an image in the 'dog' category may be targeted for pet/dog food coupons or advertisements.

Figure 4:
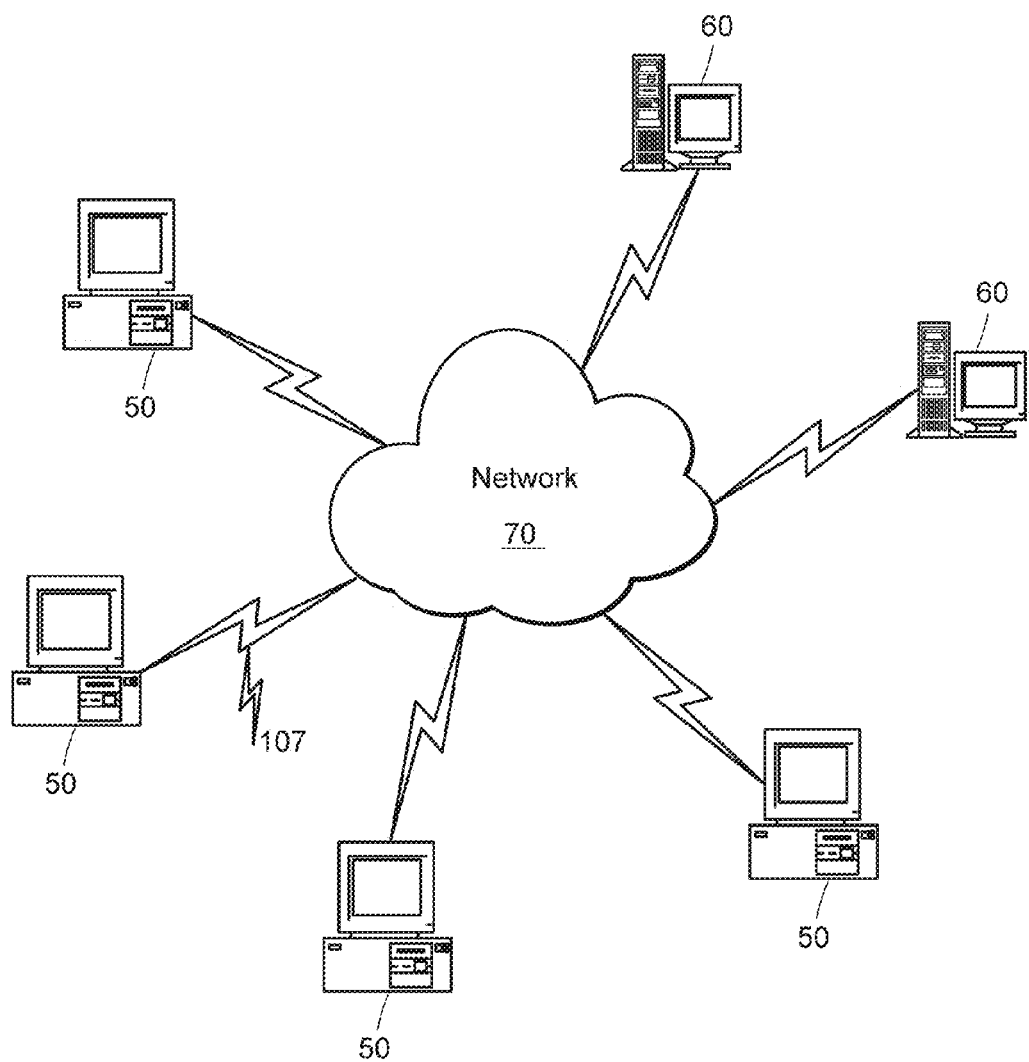
FIGS. 4 and 5 are a schematic view and block diagram, respectively, of the computers (client, server) and computer network in which embodiments of the present invention may be deployed.
Figure 5:
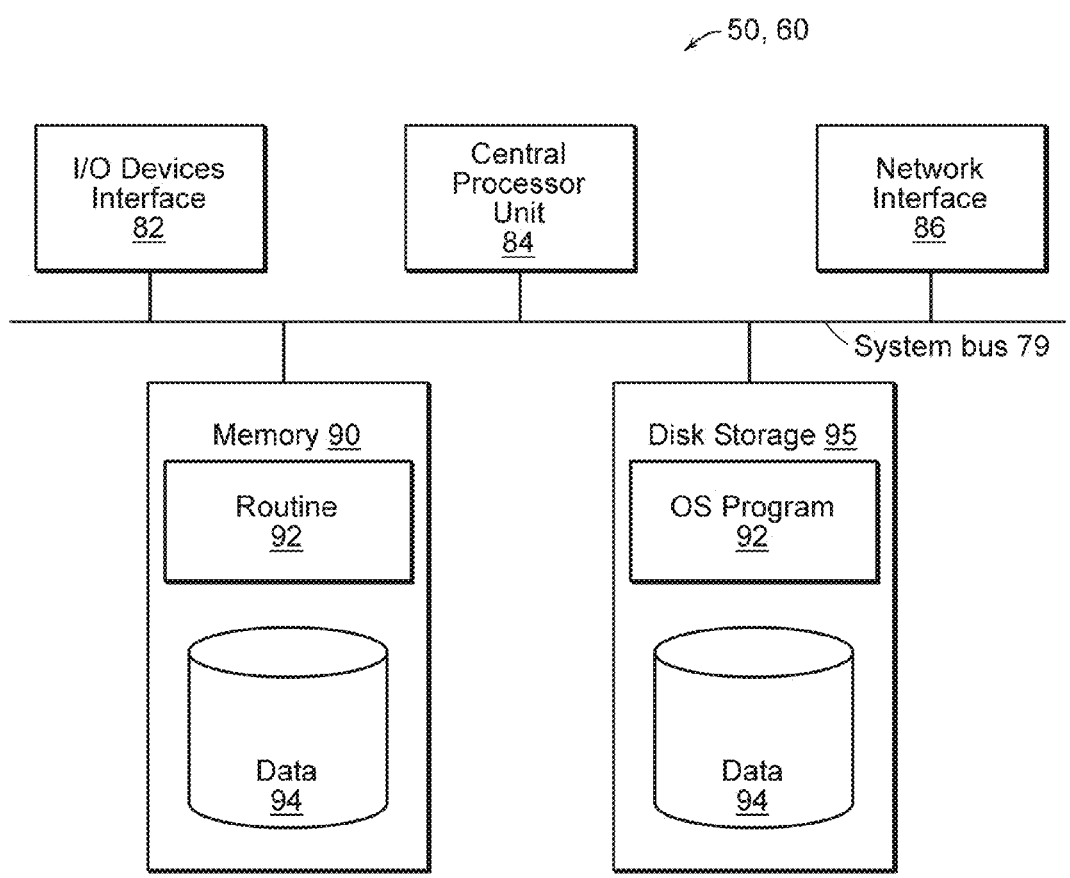

Turning now to FIGS. 4 and 5, FIG. 4 illustrates a computer network or similar digital processing environment in which the present invention may be implemented.

Client computer(s)/devices 50 and server computer(s) 60 provide processing, storage, and input/output devices executing application programs and the like. Client computers/devices 50 are for example device 12/computer 13 of FIGS. 1A and 1B above. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, e.g., automated teller machines (ATMs), Local area or Wide area networks, and gateways that currently use respective protocols (TCP/IP, Bluetooth, etc.) to communicate with one another. Other electronic device/computer network architectures are suitable.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., registration process and optional assignment of alpha-numeric values to the secret graphical images 120 and supporting modules 23-30, password strength calculator 26, authentication process 130, virtual reel/scroll/pad GUI 19 and supporting code detailed above). Disk storage 95 provides non-volatile storage for computer software instructions 92 and data 94 used to implement an embodiment of the present invention. Data 94 includes for example, graphical password database 44 (holding user defined graphical passwords and password attributes) and randomized image source/data store 222. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, other medium and the like.

Advantages

One advantage of the methods and systems embodying the present invention is resiliency to recording or shoulder surfing attacks. Given the invention can morph or mask the secret graphical image AND the graphical images are placed in random locations within the categories in the authentication selection process, the attacker would need to watch the entire authentication process in order to remember the image sequence (correct order of secret images) forming the graphical password for authentication. The graphical images before and after the masked secret graphical image provides no clue to help in the next non-authorized user attack.

Another advantage is the image set is normalized to create no perceived biases or hints that could enable an unauthorized user to discern a preferred secret graphical image over other images. The most common, popular images are removed from the image database, e.g. U.S. Flag, red rose, etc. to avoid biases in the graphical password selection/creation process 120 in some embodiments.

Another advantage is the user can increase or decrease the strength of the graphical password as described above. And such increasing/decreasing strength of the graphical password is multi-faceted providing a range of different strengths with single facet (or more) changes.

Another advantage is the strength indicator/calculator 26 empowering the user with information and a way (tools) to control the strength of his graphical password during creation of the password. A visual strength guide and the actual probability calculations are provided in the registration process 120 in some embodiments.

Equivalents

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

There can be multiple GUI configurations and methods for user input of the graphical password or selecting the secret images forming the password graphical elements during the authentication process 130. For non-limiting purposes, examples include scrolls, wheels, reels (shown), dials, pads/virtual keyboards (shown), blocks and pull down boxes. In the virtual keyboard or pad, the traditional alpha-numeric characters are replaced with the secret and random graphical images during the authentication process. Other configurations are suitable.

In embodiments, during the authentication process 130, in response to authenticating user selection of a displayed image, the system 100 highlights or moves the displayed image to a highlighted area (landing place or payline 61 or 62). The system 100 may also blur, mask, morph or obscure the images on the highlighted area 62, payline 61 area to prevent snap shots (or other recording) of the password or shoulder surfing.

Optional protocol could be added to force an initial correct choice or the graphical authentication system 100/authentication process 130 withholds the correct subsequent images (password graphical elements) from subsequent displayed graphical sets during authentication.

In one embodiment, the first secret graphical element of the user's graphical password is a merchant logo, or membership ID, or brand logo that identifies which password (used with a merchant, credit card process, etc.) is being requested.

Similarly, the secret images (graphical elements) can represent alpha-numeric values to establish username and passwords for merchant-specific (brand-specific) websites or applications. The registration process 120/password creation 23 in some embodiments assign such alpha-numeric values (strings) to each graphical element forming the password. The assigned alpha-numeric strings are stored with the respective password in password database 44. These string values can be changed and updated by the user or through an automated process through the application 14. In one embodiment, at least one of the graphical elements of a password has a respective user specific alpha-numeric string representing a personal identifier (PIN) of the user, and changing the one graphical element in the graphical password enables automatic updating of the personal identifier. Table 3 is exemplary.

TABLE 3

Graphical elements representing username per merchant system

| | | |
|---|---|---|
| janed@gmail.net | ← → | janedoe@americanidol.com |
| Br54 | ← → | Hht7 |
| 9kne | ← → | gfte |
| 1829 | ← → | 1993 |
| janed@gmail.net/ Br54 9kne 1829 | | janedoe@americanidol.com/ Hht7 gfte 1993 |

Upon authentication process 130 successfully/positively authenticating the end user at 33 in FIG. 3, the authentication process 130 may trigger a website or application specific to a merchant (or brand) and load the end-user's corresponding credentials or authentication information. In turn, the end-user is provided access to the triggered merchant website, application or system.

Further, the registration process 120 may assign user-specific alpha-numeric strings (values) to each graphical element forming the user's graphical password to ensure non-duplication of passwords among users using the same graphical elements. The user or platform administrator can control the strength of the alpha-numeric component assigned to each graphical element.

The password creation 23/registration process 120 may store indications of the user's device or access medium's unique ID in combination with the alpha-numeric values per password in password database 44 to further enhance (strengthen) the authentication process. Thus authentication process 130 identifies and compares unique ID of the in-session user's device to that stored for the authorized user in password database 44, as well as compares the in-session user selected sequence of images (i.e., input password) to the stored graphical password in database 44 as described above in FIG. 3.

Embodiments of the present invention allow for integration with additional authentication procedures to increase the strength of the authentication process. For example, the graphical secret images/elements can be attached with an alpha-numeric password or additional graphical authentication methods to increase password strength. The alpha-numeric strings of a graphical password effectively from a strong alpha-numeric password that can be used on secure networks or other platforms that require higher levels of secure authentication. In another example, embodiments allow a network or platform to push session specific random and secret graphical images to a specific end-user after an initial successful authentication sequence 130 to complete the entire authentication process, conduct a challenge process, or access different contents requiring passwords with greater strength.

The present invention provides for a method for users to disable or lock the authentication method on a specific device through remote access if the device is lost or stolen. The invention can also capture a photograph of the un-authorized user and/or capture the geographical location of the unauthorized user for rescuing the device.

What is claimed is:

1. A computer authentication system comprising:
a memory holding a graphical password of a given user, the graphical password being formed of a user selected series of certain graphical elements chosen from within at least one user-selected category;
an authentication process executable by a processor and implementing an authentication session, the authentication process having:
a user interface, and
a source of graphical elements, wherein during the authentication session the user interface (i) displays to an end-user one or more pluralities of ones of the graphical elements from the source randomly placed with the certain graphical elements dispersed throughout the pluralities, each different certain graphical element being dispersed in a respective different plurality, and (ii) requires the end-user to identify the at least one user-selected category, and then find in and select from the displayed pluralities within the at least one user-selected category each of the certain graphical elements that form the graphical password, and
wherein upon the end-user correctly selecting all of the certain graphical elements forming the graphical password, the authentication process positively authenticates the end-user as the given user of the graphical password; and
wherein the certain graphical elements of the graphical password and the graphical elements from the source are organized by respective category, and strength of the graphical password is a function of (i) a number of the graphical elements chosen in sequence from the user-selected categories used in forming the graphical password, (ii) a total number of available categories from which the user selects, and (iii) a total number of graphical elements within each of the available categories.

2. A system as claimed in claim 1 wherein the memory holding the graphical password is communicatively coupled to an access device, and the graphical password is a result of a registration process of the access device.

3. A system as claimed in claim 1 wherein the user interface employs a revolving area in which to display to the end user the pluralities of graphical elements randomly placed together with the certain graphical elements; and
the revolving area is configured for user interaction as one of a set of reels, a wheel, a disk and a dial that the end-user operates by spinning to select from the displayed pluralities each of the certain graphical elements forming the graphical password.

4. A system as claimed in claim 1 wherein the user interface displays each plurality of graphical elements randomly placed together with the respective certain graphical element in one or more pads, pull down menus or columns from which the end-user makes his selection.

5. A system as claimed in claim 1 wherein the certain graphical elements are photos, pictures or images from one or more categories of subject matter, and the images can include images or photos of colors or words.

6. A system as claimed in claim 1 further comprising a module enabling the given user to update, edit, add, and/or delete graphical elements in the source.

7. A system as claimed in claim 1 wherein at least one of the certain graphical elements indicates a merchant logo or brand, and
the authentication process further:
upon positively authenticating the end-user, triggers entry into a website or application specific to the merchant or brand.

8. A system as claimed in claim 1 wherein the source includes graphical elements retrieved or imported from any combination of: the given user's personal collection of images, third party collections of images, a social network account, licensed images and other sources.

9. A system as claimed in claim 8 wherein the retrieved or imported graphical elements are normalized for storage in the source, said normalizing ensuring that said retrieved or imported graphical elements are not identifiable as belonging to the given user or appear to be more susceptible to given user choice as a secret graphical element.

10. A system as claimed in claim 1 wherein the authentication process further obscures the end-user selections from the displayed pluralities during the authentication session in a manner that reduces susceptibility to shoulder surfing or recording of the graphical password.

11. A system as claimed in claim 1 wherein the authentication process further includes: a process for the end-user to retrieve a forgotten password, and a process to reset a password,
wherein said process for retrieving and said process for resetting a password use various levels of hints, challenge questions and/or challenge images.

12. A system as claimed in claim 11 wherein at least the process for retrieving prompts the end-user to supply an image and compares the supplied image to a challenge image previously stored by the given user during his creation of the graphical password.

13. A system as claimed in claim 1 wherein each certain graphical element has a respective user specific alpha-numeric string or other comparator used to compare selected graphical elements from the displayed pluralities to the stored graphical password of the given user, the user specific alpha-numeric string or other comparator being created by the given user or assigned through the system, ensuring of non-duplication of the graphical passwords among users using the same certain graphical elements in common.

14. A system as claimed in claim 13 wherein the memory further stores a unique identifier of the given user's device used to create the graphical password, and
the authentication process further authenticates the end-user based on device unique identifier.

15. A system as claimed in claim 1 wherein strength of the graphical password is increased by the source maintaining a relatively high number of graphical elements available for the pluralities, and by number of graphical elements being re-used in different graphical passwords of different users being limited.

16. A system as claimed in claim 1 wherein the source is a database that includes the certain graphical elements of users' graphical passwords, and
the system further comprising a reporter generating from the database aggregate non-user specific information regarding the graphical elements used in passwords.

17. A system as claimed in claim 16 wherein the certain graphical elements of graphical passwords of users are organized by category, and
the reporter enables targeted advertising to at least a subset of users having passwords with a category in common.

18. A system as claimed in claim 1 wherein the authentication process allows the end-user up to a threshold number of attempts, in the authentication session, to select the graphical password,
wherein the threshold number is pre-defined by the given user.

19. A system as claimed in claim 1 wherein the authentication session is configurable by the given user to:
last up to only a threshold period of time, and/or
be idle (without user interaction) for only a certain amount of time.

20. A system as claimed in claim 1 further comprising a strength indicator that provides to the given user a visual depiction of the probabilities of an unauthorized user correctly guessing the graphical password as the number of categories, number of certain graphical elements in each category and number of graphical elements in each category are increased.

21. A system as claimed in claim 20 wherein the strength indicator further indicates to the given user a comparison relative to probabilities of other random events.

22. A system as claimed in claim 1 further comprising a module enabling the given user to update, edit, add, and/or delete graphical elements and categories in the source.

23. A system as claimed in claim 1 wherein upon the end-user incorrectly selecting one of the certain graphical elements from the respective plurality of graphical elements, the authentication process withholds displaying the remaining certain graphical elements in the respective pluralities of graphical elements.

24. A system as claimed in claim 1 wherein the user interface further requires the end-user to place the certain graphical elements selected from the displayed pluralities in proper sequence (user-defined series order).

25. A system as claimed in claim 1 wherein at least one of the certain graphical elements has a respective user specific alpha-numeric string representing a personal identifier (PIN) of the given user, and changing the one certain graphical element in the graphical password enables automatic updating of the personal identifier.

26. A system as claimed in claim 1 wherein at least one of the following is user-defined:
the certain graphical elements;
the graphical elements from the source; and
the at least one user-selected category.

* * * * *

UNITED STATES PATENT AND TRADEMARK OFFICE
CERTIFICATE OF CORRECTION

| | | |
|---|---|---|
| PATENT NO. | : 8,881,251 B1 | Page 1 of 1 |
| APPLICATION NO. | : 13/774949 | |
| DATED | : November 4, 2014 | |
| INVENTOR(S) | : Stuart Hilger | |

It is certified that error appears in the above-identified patent and that said Letters Patent is hereby corrected as shown below:

In The Claims

In Column 17, Claim 1, line 8, after "formed of a" delete "user selected" and insert -- user-selected --.

Signed and Sealed this
Tenth Day of February, 2015

Michelle K. Lee
*Deputy Director of the United States Patent and Trademark Office*